UNITED STATES PATENT OFFICE.

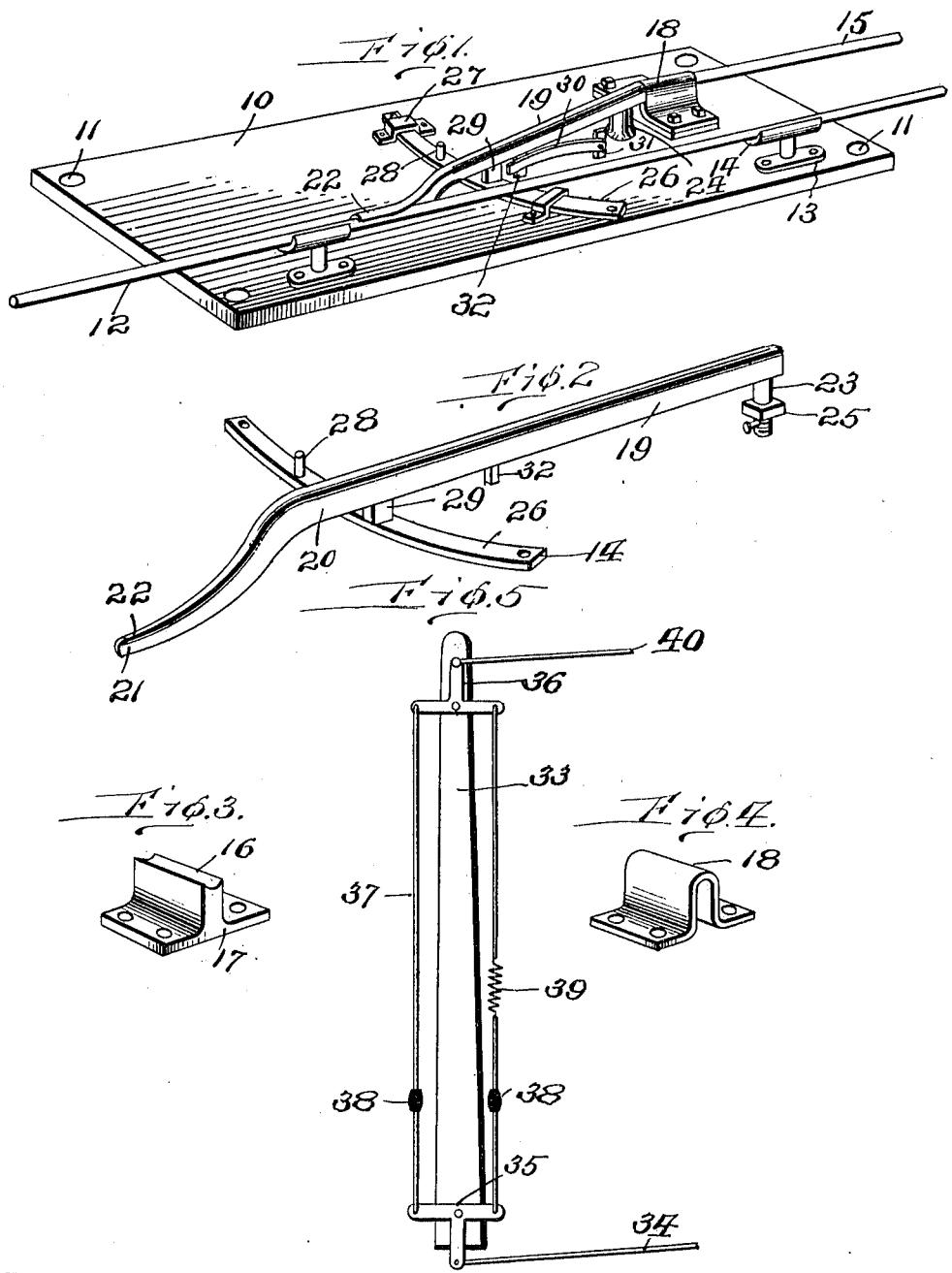

JOHN G. MUNSON, OF CEDAR RAPIDS, IOWA, ASSIGNOR OF ONE-THIRD TO JOSEPH D. WARDLE AND ONE-THIRD TO EDWARD F. WINSLOW, BOTH OF CEDAR RAPIDS, IOWA.

TROLLEY-SWITCH.

1,096,741.　　　　　Specification of Letters Patent.　　Patented May 12, 1914.

Application filed March 31, 1913.　Serial No. 757,965.

*To all whom it may concern:*

Be it known that I, JOHN G. MUNSON, a citizen of the United States of America, residing at Cedar Rapids, in the county of Linn and State of Iowa, have invented certain new and useful Improvements in Trolley-Switches, of which the following is a specification.

This invention relates to improvements in trolley switches.

An object of the invention is to provide a construction of automatic switching means whereby the trolley wheel will follow the trolley wire of a switch when the railroad switch is closed.

A further object is to provide a means for automatically shifting the trolley wire switch upon the actuation of the railroad switch.

A still further object is to provide an automatic device which is easily and cheaply manufactured and which fulfils the requirements designed for the present invention.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like reference numerals designate corresponding parts throughout the several views: Figure 1 is an inverted perspective view of the trolley wire switching mechanism. Fig. 2 is a perspective view of the switch arm detached. Figs. 3 and 4 are perspective views of the trolley wire anchoring means, and Fig. 5 is a detailed view of the connection between the railroad and trolley wire switch arms.

Referring more in detail to the drawings, it will be noted that the plate 20 adapted for mounting the trolley switch mechanism and shown inverted in Fig. 1 is adapted for suspension in the desired position over the track by supporting wires connected thereto through the perforations 11.

The main trolley wire 12 is firmly mounted on the lower face of the plate by means of brackets 13 to the socket members 14 of which the wire is secured.

The trolley wire 12 being suspended over and employed in connection with the main track, a trolley wire 15 employed by the switch track is secured beneath the plate 10 by being fitted in the longitudinal groove 16 of the bracket block 17 which is secured to said plate, while the yoke member 18 fits over said block securely retaining the end of the trolley wire 15 between the block and yoke member. For conducting the trolley wheel to and from the switch trolley wire 15 in connection with the main wire 12, a switch arm 19 is provided which consists of a bar member having a compound slight lateral and vertical turn 20 adjacent one end thereof which free end is provided with a lapping groove 21 with a side top flange 22 for fitting partially around the trolley wire 12 when the same engages therewith while the switch is closed. Said member 19 has the pivot bolt 23 extending through the downwardly extending post 24 and then through the plate 10 being retained in a pivotal relation by means of the nut 25. For controlling the movement of the switch 19, a side plate 26 is provided flatly engaging the lower face of the plate 10 and being of arcuate form is mounted slidably thereon in the brackets 27 while the movement thereof is limited by the stop lug 28 and said member 26 is connected to the switch 19 by means of the connecting post 29. The switch 19 has its pivoted end substantially engaging the anchoring means 17, 18 for the switch wire 15 and all of the members upon the plate 10 being electrically connected, it is only necessary that the switch member 19 conduct the trolley wheel over the desired path. For retaining the switch member 19 normally open and with the stop lug 28 engaging one of the brackets 27, a spring strip member 30 is rigidly secured at one end to a post 31 upon the bottom of said plate while the free end of said spring engages the upper arm 32 of the switch rod 19. By this construction, it will be seen that the force of the spring 30 normally retains the switch in open position.

It being desired to throw the trolley switch 19 to a closed position for the purpose of conducting the trolley wheel between the switch wire and main trolley wire, a connecting means is provided upon the post 33 positioned adjacent the track. This means consists of a rod 34 pivoted at one end to the movable switch of the railroad track (not shown) and the movement of which track switch member thereby longitudinally moves the rod 34 for rocking the lower T-arm 35.

Said arm 35 being pivoted to the post 33 is connected to an upper T-arm 36 by means of connecting rods 37 having portions thereof insulated from each other as at 38, while a spring connection 39 may also be interposed in one of said rods if desired. The arm 36 has pivoted thereto a connecting rod 40 which is adapted for engagement with its free end in one of the perforations 14 of the guide 26.

The objects to be attained by the device being understood as well as the structural elements thereof, the operation it is thought will be readily appreciated. A movable switch member upon the electric car track being for instance in the form of a knife switch is pivotally connected to an end of the rod 34 so that when said knife switch is closed to allow the car to pass either upon or off of the switch, the connecting means just described communicates motion to the rod 40 and thereby through the guide 26 to actuate the switch member 19 to a corresponding closed position upon the main trolley wire 12 and to the position illustrated in Fig. 1. A release of the track switch member and an opening of the same likewise communicates an opposite opening movement to the switch member 19 which is assisted and maintained under normal conditions by the spring 30. Thus, the trolley wheel is insured to automatically follow the line of travel taken by the car. The installing of this switch requires no cutting nor change in the line wire. The vertical bend of the arm 19 depresses the trolley so as to allow the flanges on the trolley wheel to clear the main wire before the trolley leaves the direction of the main line wire and as soon as it clears the line wire, it is then diverted by the lateral bend in the arm to the line of the side track wire.

While the forms of the invention herein shown and described are what are believed to be preferable embodiments thereof, it is nevertheless to be understood that minor changes may be made in forms, proportion and details of construction without departing from the spirit and scope of the invention.

I claim:—

A switch member comprising a suspension plate, a main line secured to said plate, a switch line, a block and yoke securing means upon said plate engaging the end of said switch line, a post upon said plate adjacent said end, a downwardly and laterally curved switch arm pivoted to said post, a grooved and flanged free end upon said arm adapted for receiving said main line, an arcuate slide plate flatly mounted upon said suspension plate with its radial center at the pivot of said arm, a vertical connecting post rigidly positioned upon said arm and centrally of said slide plate, guide stops upon said suspension plate and said slide plate positioned therethrough, a lug upon said slide plate adapted for engagement with one of said stops when the switch is in normal open position.

In testimony whereof I affix my signature in presence of two witnesses.

JOHN G. MUNSON.

Witnesses:
EDWARD K. DIEHL,
ETHELYN McGRAW.